United States Patent

Maruyama

[15] 3,704,760
[45] Dec. 5, 1972

[54] ELECTROPNEUMATIC PROPELLING SYSTEM FOR VEHICLES

[72] Inventor: Kunimori Maruyama, Yokohama, Japan

[73] Assignee: Oscar Kogyo Kabushiki Kaisha, Tokyo-To, Japan

[22] Filed: June 22, 1971

[21] Appl. No.: 155,422

[52] U.S. Cl. ...................... 180/66 B, 180/65 A
[51] Int. Cl. ...................................... B60l 11/14
[58] Field of Search ............... 180/65 A, 66 B, 65 R

[56] References Cited

UNITED STATES PATENTS

| | | | |
|---|---|---|---|
| 3,379,008 | 4/1968 | Manganaro | 180/66 B |
| 3,543,873 | 12/1970 | Toy | 180/65 A |
| 3,556,239 | 1/1971 | Spahn | 180/65 A |
| 3,620,323 | 11/1971 | Maeda et al. | 180/65 A |

*Primary Examiner*—Gerald M. Furlenza
*Assistant Examiner*—R. B. Johnson
*Attorney*—Holman & Stern

[57] ABSTRACT

A system for electropneumatically propelling a vehicle comprises essentially a pneumatic motor and an electric motor. The pneumatic motor is driven by the air supplied under pressure from a source of compressed air such as a cylinder or a liquid-air tank, while the electric motor is driven by a storage battery in which is stored electrical energy produced by a generator, which is driven by a turbine operated by air supplied under pressure from the source of compressed air. Both the pneumatic motor and the electric motor are connected to transmission means linked to the driving wheels of the vehicle. The transmission means includes first and second differential means adapted for controlling the supply of air to the pneumatic motor and for causing the pneumatic motor to rotate in the same direction as a preselected rotational direction of the electric motor.

6 Claims, 11 Drawing Figures

ELECTROPNEUMATIC PROPELLING SYSTEM FOR VEHICLES

BACKGROUND OF THE INVENTION

The present invention relates to a novel system for electropneumatically propelling a vehicle.

Automakers now are making desperate efforts to solve the air pollution problem caused by motor vehicles that are powered by conventional internal combustion engines. The need is an urgent one in the United States and other heavily motorized countries of the world where more and more rigid governmental pollution regulations are being imposed upon the motor vehicles.

While the search may continue for new, nonpolluting power sources, much attention is now being focused upon electric cars, various types of which have been proposed, and some already have been manufactured on a considerable scale. A major factor hampering the growth of the electric cars, however, is that their batteries are too expensive and do not have enough capacity to drive the vehicles for any practical purposes. Nevertheless, the fact remains that electric cars are one clear solution to the air pollution problem, being admirably suitable for some transportation services.

SUMMARY OF THE INVENTION

It is accordingly an object of the present invention to provide a novel electropneumatic propelling system for vehicles to be run with any likelihood of polluting the air.

Another object of the invention is to provide an electropneumatic propelling system for vehicles wherein an electric motor and a pneumatic motor are provided in place of a conventional engine or its equivalent, the power delivered by the electric motor and that by the pneumatic motor being suitably combined for propelling the vehicle.

Another object of the invention is to provide an electropneumatic propelling system for vehicles wherein one and the same source of compressed air is utilized to drive both the pneumatic motor and the electric motor, the latter being driven via a pneumatic turbine, generator and storage battery.

Still another object of the invention is to provide an electropneumatic propelling system for vehicles wherein the electric motor and pneumatic motor are both coupled to transmission means of such organization that, upon depression of an accelerator pedal linked to a changeover valve means, the pneumatic motor is rotated only in the same direction as a preselected rotational direction of the electric motor.

A further object of the invention is to provide an electropneumatic propelling system for vehicles wherein the transmission means is associated with the changeover valve means in such a manner that both the electric motor and the pneumatic motor are driven simultaneously only when the delivery of large torque is required and that the vehicle is automatically propelled by the electric motor alone when it attains a cruising condition.

A further object of the invention is to provide an electropneumatic propelling system for vehicles wherein the electric motor and the pneumatic motor are so adapted that, when the vehicle goes downhill, the former automatically stops rotation while the latter serves as a substantial "engine brake" to arrest the accelerated motion of the vehicle.

An additional object of the invention is to provide an electropneumatic propelling system for vehicles so designed that it requires an electric motor of comparatively small output and a storage battery of comparatively small capacity.

Other objects and advantages will appear from the following detailed description taken in connection with the appended drawings.

BRIEF DESCRIPTION OF THE DRAWINGS

In the drawings:

FIG. 5($b$) is an enlarged detail view, partly in section, of a valve spool of FIG. 5;

DETAILED DESCRIPTION OF THE INVENTION

Figure 1:
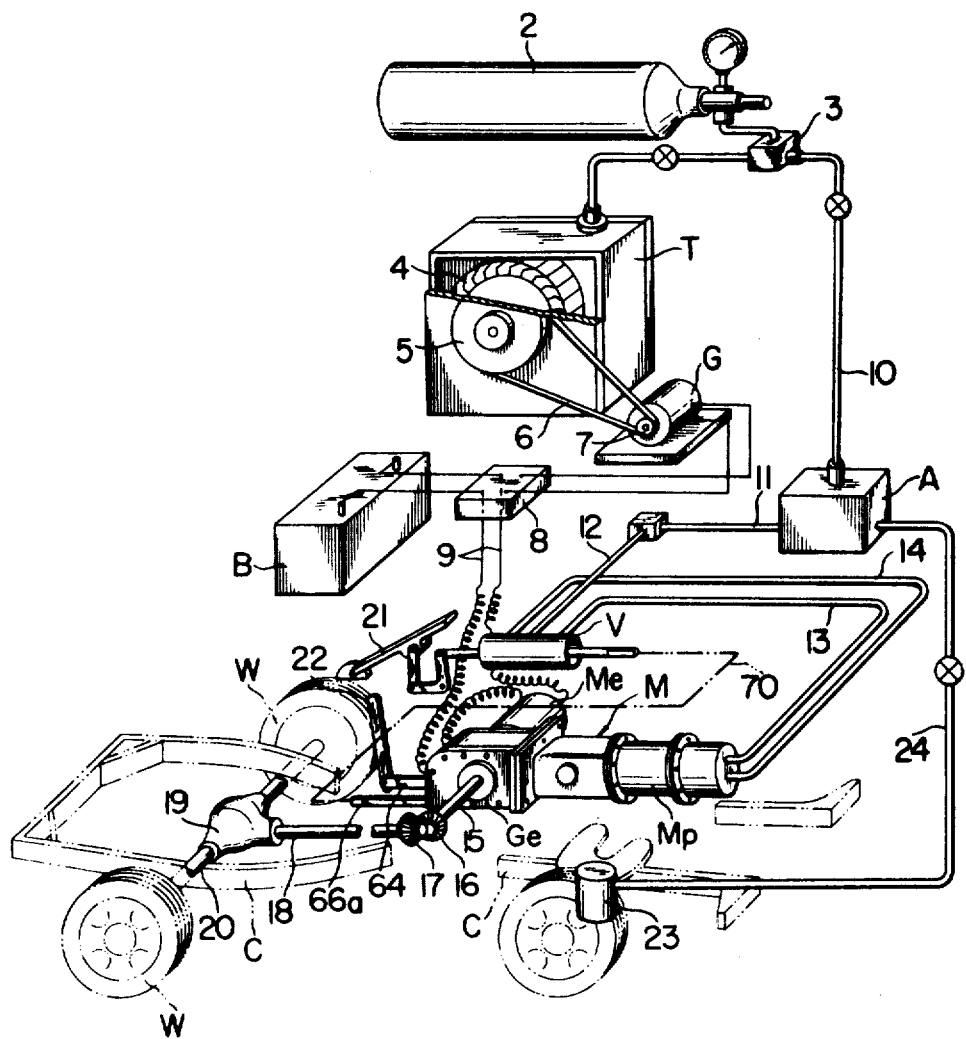
FIG. 1 is a schematic perspective view showing the layout of an electropneumatic propelling system in accordance with the present invention.

Referring now to the drawings, and in particular to FIG. 1 thereof for a description of a preferred embodiment of the invention illustrated therein by way of example, a cylinder or vessel 2 filled with liquefied air supplies air under pressure to a turbine T via a pressure regulator 3 and so forth, thereby to rotate a rotor 4. The rotation of this turbine rotor 4 is conveyed to a generator G via suitable transmission means (5, 6 and 7, for example). The electrical energy thus produced by the generator G is collected in a storage battery B via voltage regulating means 8.

The reference character M generally indicates a prime mover (in a broader sense of the term) for the vehicle in accordance with the present invention, comprising an electric motor M$e$ and a pneumatic motor M$p$. The electric motor M$e$ is rotatable in both directions driven by the electrical energy supplied from the storage battery B via conductors 9, as hereinafter described in detail. The pneumatic M$p$ is driven by the air that is supplied under pressure from the aforesaid cylinder 2 and flowing through a conduit 10 (which may have a valve), accumulator A, conduit system 11 and 12, changeover valve V, and conduits 13 and 14. This pneumatic motor Mp is of a reciprocating piston type, as described later in greater detail.

Both the electric motor Me and the pneumatic motor Mp are coupled to transmission gear means Ge, whose output shaft 15 is connected via a pair of bevel gears 16 and 17 to an input shaft 18 of differential gear means 19 on an axle 20 of driving wheels W of the vehicle. The wheels W are thus driven by the combined powers of the electric motor Me and the pneumatic motor Mp delivered from the output shaft 15. These motors and the transmission gear means may be suitably mounted upon a vehicle chassis C. An accelerator pedal 21 is suitably linked to the changeover valve V, while a forward reverse control lever 22 is coupled to the transmission gear means Ge. A shock-absorber 23, suitably installed between the vehicle body and wheels, may be of a piston and cylinder type, the cylinder being filled with air so that pressure will build up therewithin due to the vertical oscillations of the body during running of the vehicle. This pneumatic pressure is directed to the accumulator A via a conduit 24.

Figure 2:
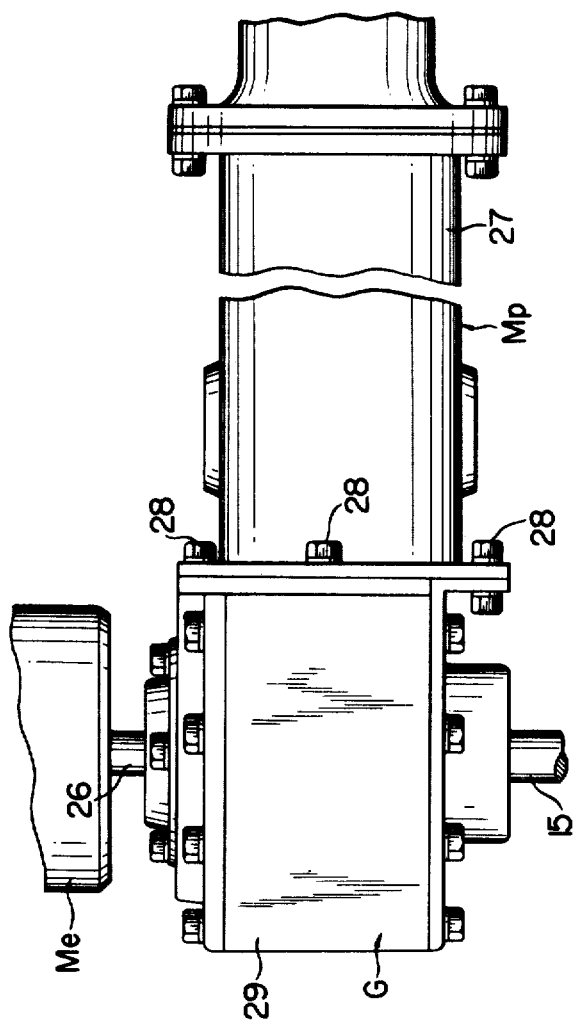
FIG. 2 is a fragmentary plan view showing the manner in which an electric motor and a pneumatic motor are coupled to transmission gear means in the electropneumatic propelling system of FIG. 1.

As illustrated in greater detail in FIG. 2, the transmission gear means Ge is connected to the electric motor Me by means of an input shaft 26 of the former. The pneumatic motor Mp has a cylindrical housing 27 which extends at right angles to the input shaft 26 and output shaft 15 of the transmission gear means Ge, the housing 27 being secured to its casing or gearbox 29 by adequate means 28.

Figure 3:
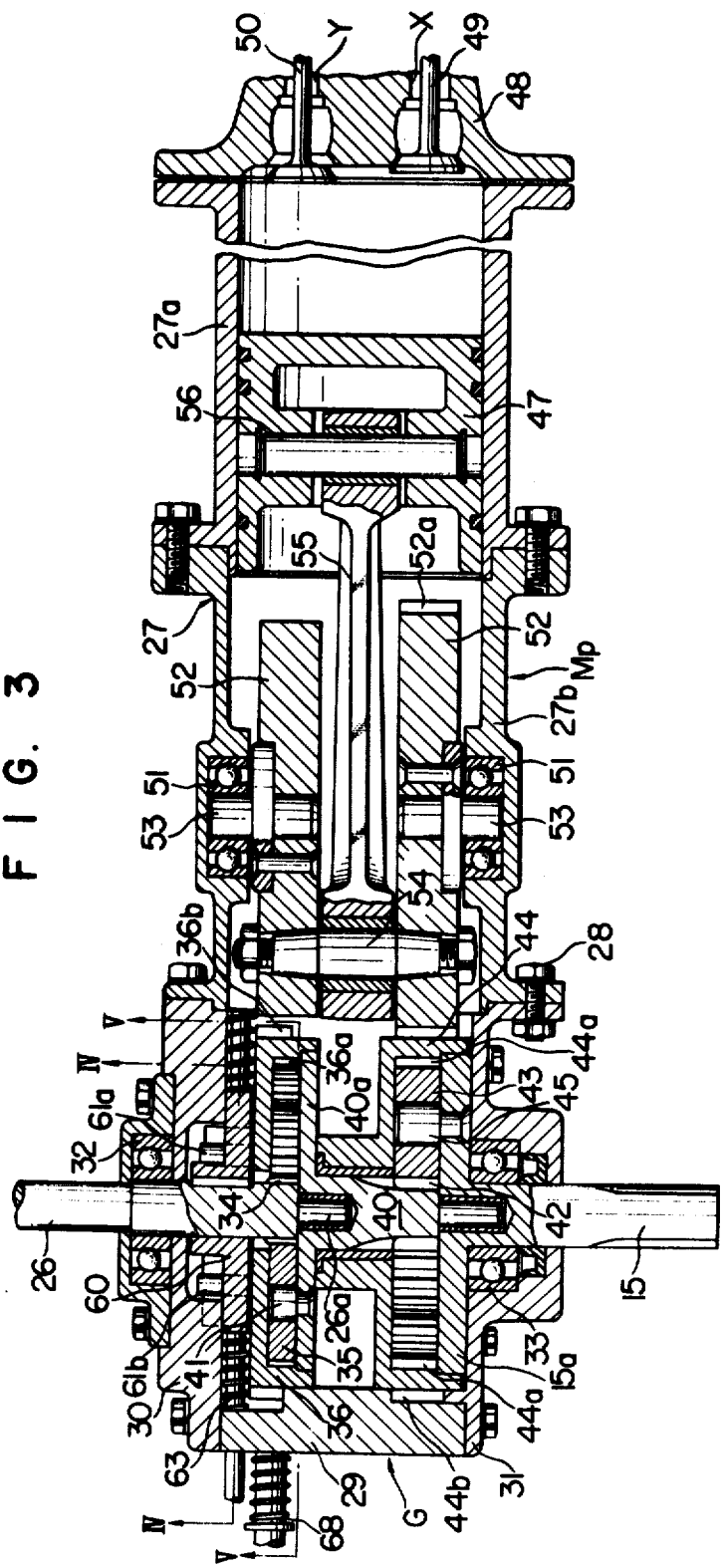
FIG. 3 is a longitudinal sectional view showing the inner details of the transmission gear means and the pneumatic motor of FIG. 2.

As shown in the sectional view of FIG. 3, both ends of the casing 29 of the transmission gear means Ge are closed by covers 30 and 31. The cover 30 rotatably supports the input shaft 26 by means of a bearing 32, while the cover 31 rotatably supports the output shaft 15 by means of a bearing 33. At the inner end of the input shaft 26 there is formed a sun wheel 34 that is a part of first planet differential means hereinafter to be described.

As illustrated in both FIGS. 3 and 5, the sun wheel 34 is in mesh with a plurality of planet wheels 35 which are themselves meshed with the internal teeth 36a of a ring gear 36. An intermediate shaft 40 is provided coaxially inside of the input shaft 26. This intermediate shaft 40 is integrally formed with a disk 40a on which the aforesaid planet wheels 35 are rotatably supported by shafts 41, and which loosely receives a pin 26a projecting from the inner end of the input shaft 26. At the other end of the intermediate shaft 40 there is formed another sun wheel 42 constituting a part of second planet differential means provided for the transmission gear means Ge. This sun wheel 42 is meshed with planet wheels 43, while these planet wheels are in mesh with the internal teeth 44a of a ring gear 44. Shafts 45 supporting respective planet wheels 43 are imbedded at their ends in a disk 15a that is integral with the output shaft 15. The aforesaid ring gears 36 and 44 also have external teeth 36b and 44b, respectively.

Also as shown in FIG. 3, the pneumatic motor Mp has a piston 47 slidably installed in the cylinder 27a which is a part of the overall pneumatic motor housing 27. A pair of valve means 49 and 50 are provided in a cylinder head 48 for the control of air supplied to and discharged from the pneumatic motor Mp. These valve means will open and close their respective air ports X and Y by means of known cam mechanisms or the like. Adjacent the cylinder 27a, there is provided a crankcase 27b which also forms a part of the overall pneumatic motor housing 27, and which, as above mentioned, is secured to the transmission gear casing 29 by the means 28.

A pair of bearings 51 within the crankcase 27b rotatably support the shafts 53 of parallel disks 52, one of the disks having teeth 52a on its periphery which are in mesh with the external teeth 44b of the ring gear 44. Eccentrically and imbeddedly fixed to both disks 52, a crankpin 54 is linked to a pin 56 of the piston 47 by means of a connecting rod 55. As this piston 47 is caused to reciprocate by the supply of air, the disks 52 are both rotated by the crankpin 54 via the connecting rod 55. This rotation of the disks 52 is imparted to the ring gear 44 via the intermeshing teeth 52a and 44b, and thence to the output shaft 15 via the planet wheels 43. The same rotation is also conveyed to the input shaft 26 via the intermediate shaft 40 and the first planet differential means.

Inasmuch as both the electric motor Me and the pneumatic motor Mp may be driven simultaneously, it is imperative that they rotate the output shaft 15 in the same direction. Accordingly, in order to prevent the pneumatic motor Mp from rotating in the direction opposite to a preselected rotational direction of the electric motor Me, there is provided the following device according to the present invention.

Figure 4:
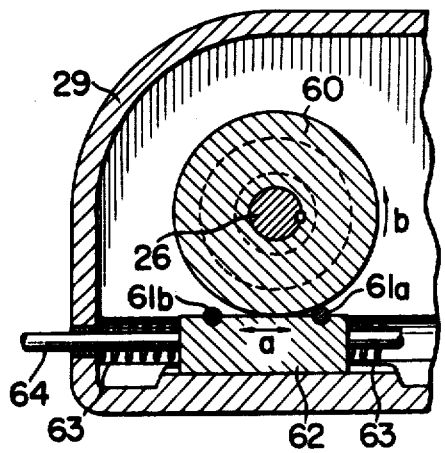
FIG. 4 is a sectional view taken along the plane of line IV—IV in FIG. 3.

As illustrated in both FIGS. 3 and 4, this device is broadly comprised of a disk 60, which is keyed or otherwise suitably mounted on the input shaft 26, and a carriage 62 supporting a pair of rollers 61a and 61b to be moved into contact with the rim of the disk 60. Slidable in the direction of the arrow a as indicated in FIG. 4, the carriage 62 is normally held at a neutral position by means such as helical compression springs 63. A rod 64 extends from one end of this carriage 62 and, projecting out of the transmission gear casing 29, is coupled to the aforementioned forward reverse control lever 22 as illustrated in FIG. 1. In the condition of FIG. 4, in which the carriage 62 is displaced leftward as viewed in the drawing by the operation of the control lever 22, the input shaft 26 is permitted to turn only in the direction of the arrow b, which is assumed to be forward, because of the roller 61a wedged in between the carriage 62 and the disk 60. By turning the control lever 22 in the opposite direction, the carriage 62 is displaced rightward as viewed in FIG. 4 so that its roller 61b is caught between the carriage and the disk 60. The input shaft 62 in this instance is capable of making only a reverse rotation.

Figure 5A:
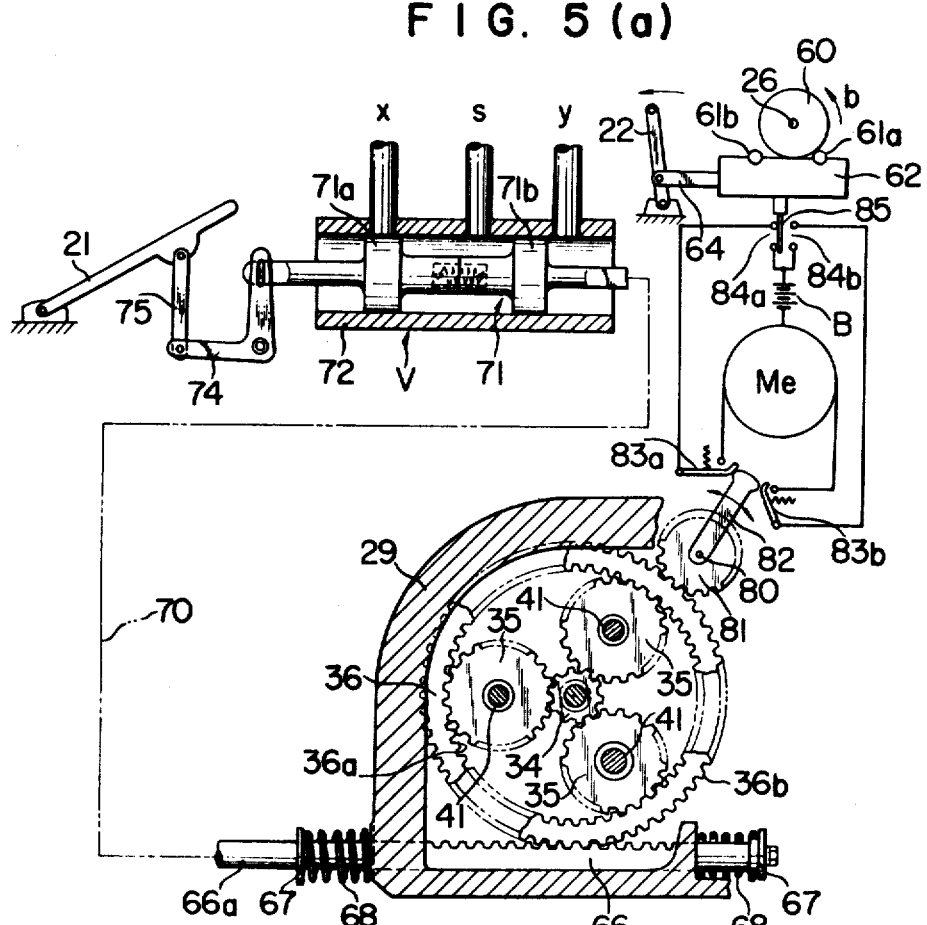
FIG. 5($a$) is a schematic view indicating a condition of some pertinent mechanisms of the electropneumatic propelling system prior to the start-up of the vehicle, the differential means in the drawing being taken along the plane of line V—V in FIG. 3.

With reference now made to FIG. 5(a) in particular, the external teeth 36b of the ring gear 36 of the first planet differential means are meshed with a rack 66 which is slidable on the inner surface of the casing 29 and which is normally kept at its centered or neutral position by such means as helical compression springs 68 installed between stops 67 and casing 29. An extension 66a of this rack 66 is connected to a spool 71 of the aforesaid changeover valve V via a system of linkages 70 (not fully illustrated) as in FIGS. 1 and 5(a). The casing 72 of the changeover valve V is in the shape of an open ended cylinder, in which the spool 71 is slidably installed. This valve casing 72 is formed with a port S leading from the source of compressed air via the conduit 12 and so forth, a port x in communication with the intake port X of the pneumatic motor Mp via the conduit 14, and a port y in communication with the exhaust port Y of the same via the conduit 13 (refer to FIG. 1). The opposite end of the spool 71 is coupled to the accelerator pedal 21 via a bell crank 74 and link 75.

Figure 5B:
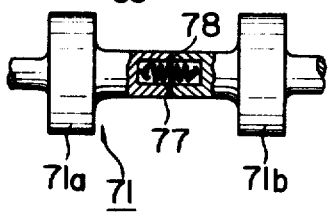

As illustrated in greater detail in FIG. 5(b), the spool 71 is made up of two separable portions 71a and 71b that are pulled together by means of a tension spring 77. Thus the opposing ends 78 of these portions are ordinarily closely contacting each other.

Referring back to FIG. 5(a), the external teeth 36b of the ring gear 36 of the first planet differential means are also in mesh with a pinion 81 on a shaft 80 suitably supported by the casing 29. This pinion 81 is fixedly provided with an arm 82 which is swingable to operate a pair of normally open electrical switches 83a and 83b. The switch 83a is closed when the arm 82 makes a counterclockwise turn as viewed in FIG. 5(a), while the switch 83b is to be closed when the arm turns clockwise. The switch 83a is included in a circuit adapted for the forward rotation of the electric motor Me, which comprises the motor Me, battery B and contact pair 84a. The other switch 83b is included in a circuit for the reverse rotation of the same, comprising the motor Me, battery B and contact pair 84b. A movable contact 85, which is made to move in coordination with the motion of the mentioned carriage 62, closes the contact pair 84a upon leftward movement of that carriage 62, and the contact pair 84b upon rightward movement of the same as viewed in FIG. 5(a). The movable contact 85 is not necessarily secured to the carriage 62 as in the drawing, but may be secured to the rod 64 or even directly to the control lever 22, although in this latter case the relative positions of the contact pairs 84a and 84b may have to be modified accordingly.

FIG. 5(a) illustrates a condition prior to the start-up of the vehicle, in which the spool 71 of the changeover valve V is at its central or neutral position thus discommunicating the ports x and y from the port S. The rack 66 also is centered. The arm 82 of the pinion 81 keeps both of the electrical switches 83a and 83b opened, and the control lever 22 is turned leftward as viewed in FIG. 5 thereby to permit, upon closure of the switch 83a, the forward rotation of the electric motor Me. By the leftward displacement of the carriage 62, the roller 61a is caught between the carriage and the disk 60 so as to permit only the forward rotation (indicated by the arrow b) of the shaft 26. The movable contact 85 keeps the contact pair 84a closed.

Figure 6:
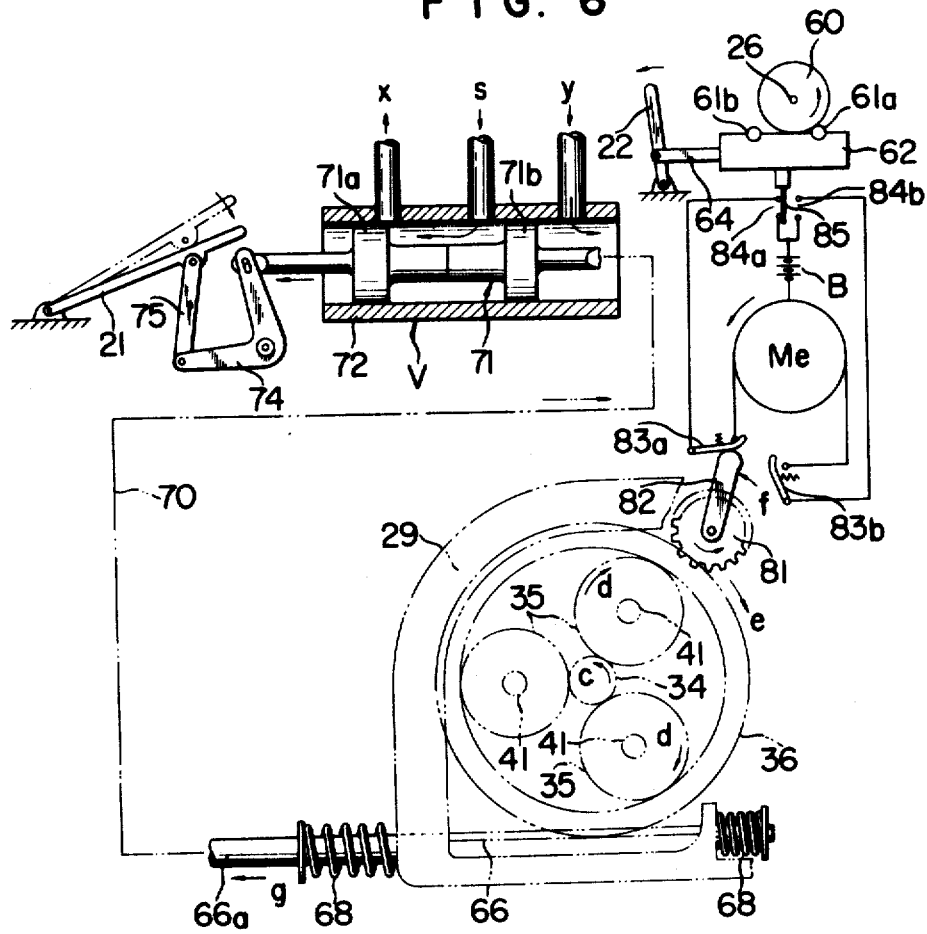
FIG. 6 is a view similar to FIG. 5 indicating a start-up condition of the vehicle.

FIG. 6 is illustrated to show a start-up condition, in which the accelerator pedal 21 is depressed as indicated by the arrow in the drawing, thereby causing the leftward displacement of the spool portion 71a of the changeover valve V. At this instant the ports S and x are intercommunicated so that the compressed air from the port S is made to flow into the intake port X of the pneumatic motor Mp via the conduit 14 (refer to FIGS. 1 and 3). The resultant reciprocation of the piston 47 and hence the rotation of the disks 52 is transmitted to the output shaft 15 via the ring gear 44 and the planet wheels 43. The same rotation imparted to the ring gear 44 is also conveyed to the input shaft 26 via the intermediate shaft 40. Since, however, the input shaft 26 then is permitted to rotate only in the forward direction as above mentioned, the disks 52 of the pneumatic motor Mp at the start of operation are turned in the direction that will cause the forward rotation of the output shaft 15.

Upon forward rotation of the output and input shafts 15 and 26, the sun wheel 34 of the first planet differential means starts rotating in the direction indicated by the arrow c in FIG. 6, thereby causing the rotations of the planet wheels 35 in the direction of the arrow d. Should the ring gear 36 be immovable, the planet wheels 35 would revolve along the internal teeth of the ring gear 36 while rotating about their own shafts 41. But the ring gear 36 is only retained by the springs 68 through the rack 66, so that the great load applied at the time of vehicle starting will at first cause no substantial displacement of the planet wheels 35 relative to the ring gear 36 but will rotate the latter in the direction of the arrow e via the former. By this turn of the ring gear 36 and hence of the pinion 81 the arm 82 is swung in the direction of the arrow f thereby closing the electrical switch 83a. As a result the electric motor Me is set in operation almost at the same time with the start-up of the pneumatic motor Mp to provide a great overall starting torque to the output shaft 15.

The above explained initial turn of the ring gear 36 also causes the rack 66 to move leftward in FIG. 6 (indicated by the arrow g) against the right hand spring 68. This leftward movement of the rack 66 stops when the force exerted thereto by the ring gear 36 is counterbalanced by that of the spring 68. Thereupon the planet wheels 35 start revolving around the sun wheel 34 to transmit the rotation of the input shaft 26 to the output shaft 15, while this output shaft 15 is also rotated by the pneumatic motor Mp, so that the vehicle now starts up. The mentioned leftward displacement of the rack 66 causes the portion 71b of the valve spool 71 to move leftward as viewed in FIG. 6 via the system of linkages 70.

All these actions described in the preceding three paragraphs take place almost in an instant. Since the vehicle in the above instance of start-up is under no greater load than that applied when it goes uphill, the port x of the changeover valve V is not fully opened by the spool 71 as illustrated in FIG. 6. The pneumatic motor Mp does not therefore operate at its full capacity. Following the start-up the vehicle will run under gradually decreasing load, with the result that both the rack 66 and the spool 71 move rightward in FIG. 6 to provide a cruising condition illustrated in FIG. 7.

Figure 7:
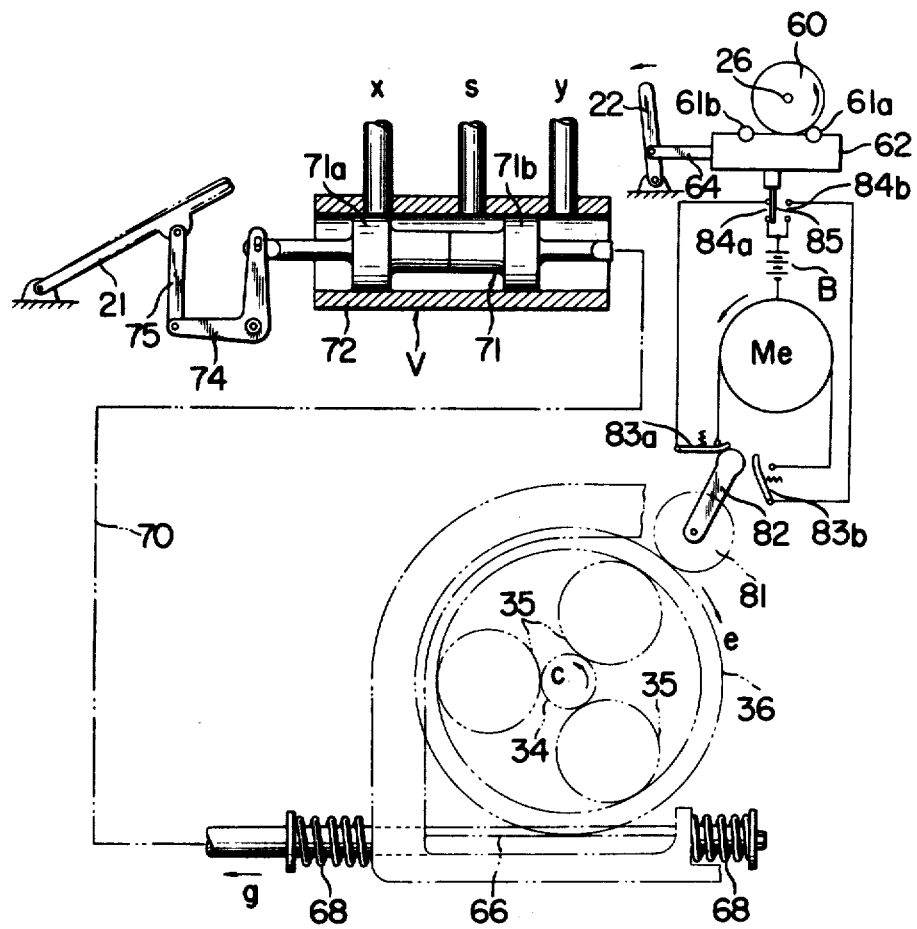
FIG. 7 is also a view similar to FIG. 5 indicating a cruising condition of the vehicle.

Referring now to FIG. 7, in which the rack 66 is still slightly displaced leftward by the clockwise turning force of the ring gear 36 (indicated by the arrow e), the arm 82 of the pinion 81 keeps the switch 83a closed so that the electric motor Me is in motion. In order to ensure the closure of the switch 83a whether the arm 82 is swung greatly as in FIG. 6 or only slightly as in FIG. 7, it is necessary, or at least desirable, that the movable contact of the switch 83a extend along the course of swing of the leading end of the arm and that this leading end be so formed as to make some elastic deformation.

During this cruising condition the rack 66 is only slightly moved in the direction of the arrow g as already mentioned, so that the valve spool 71 also is moved correspondingly leftward as in FIG. 7, the accelerator pedal 71 being slightly depressed. The valve spool 71 then closes the port x to stop the supply of air to the pneumatic motor Mp, with its output decreased with the gradual closure of the port. Thereafter the vehicle will be propelled solely by means of the electric motor ME.

Figure 8:
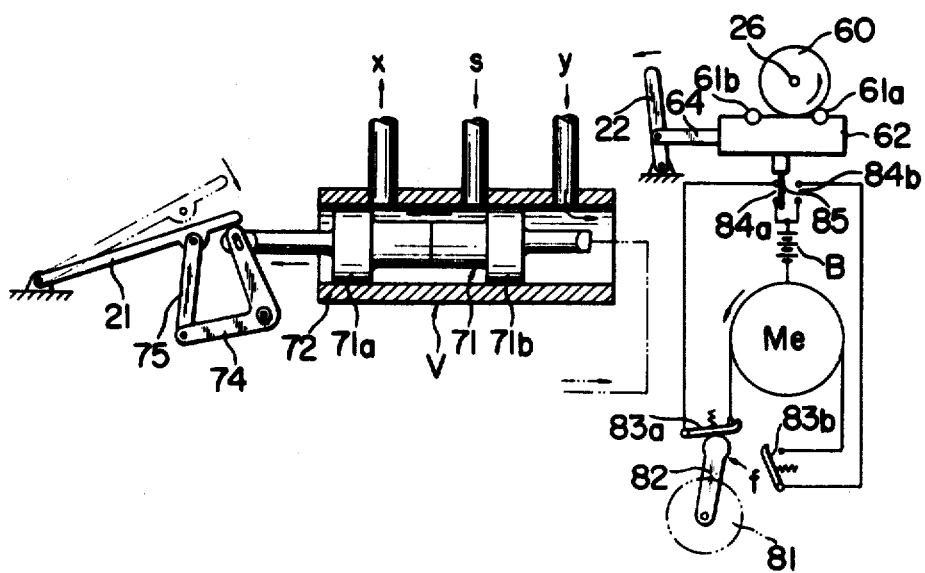
FIG. 8 is a view similar to FIG. 5 (except for the absence of the differential means, etc.) indicating a condition when the vehicle is going uphill.

Illustrated in FIG. 8 is a condition when the vehicle is going uphill, or when the vehicle runs under greater load than that at the time of start-up (refer to FIG. 6). The valve spool 71 is this case moves farther leftward than its position illustrated in FIG. 6, thus substantially fully opening the port x. The rack 66 also travels toward the leftward extremity of its permitted stroke thereby to correspondingly urge the spool portion 71b in the arrow marked direction in FIG. 8.

Figure 9:
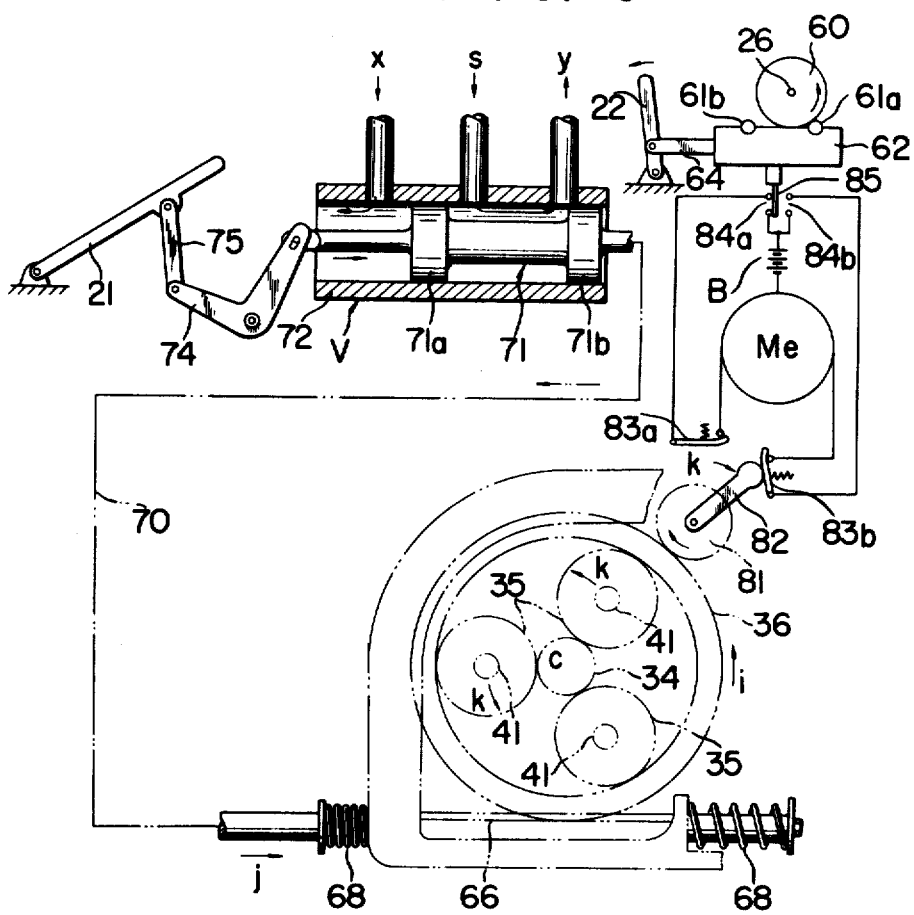
FIG. 9 is a view similar to FIG. 5 indicating a condition when the vehicle is going downhill.

FIG. 9 shows a condition when the vehicle is going down-hill. In this case the planet wheels 35 are compulsorily revolved counterclockwise (indicated by the arrows h) due to the naturally accelerated rotation of the vehicle wheels that is transmitted back through the output shaft 15. The accompanying counterclockwise rotation of the ring gear 36 (indicated by the arrow i in FIG. 9) causes the rack 66 to move in the direction of the arrow j and the arm 82 to swing in the direction of the arrow k via the pinion 81. The switch 83b is now closed and the switch 83a opened, whereupon the forward rotation of the electric motor Me terminates. The closure of the switch 83b does not initiate the reversed rotation of the motor Me since the Contact pair 84b is kept closed. Because of the great turning force conveyed from the wheels of the vehicle going downhill, the rack 66 is considerably strongly urged in the direction j thereby causing a proportionately great displacement of the spool 71 of the changeover valve V, so that its ports S and y are now intercommunicated. Since, on the other hand, the piston 47 of the pneumatic motor Mp is made to compress the air trapped within the cylinder 27a by the rotation of the output shaft 15 and so forth, the pneumatic motor operates substantially as a so-called "engine brake" to reduce the accelerated motion of the vehicle.

Figure 10:
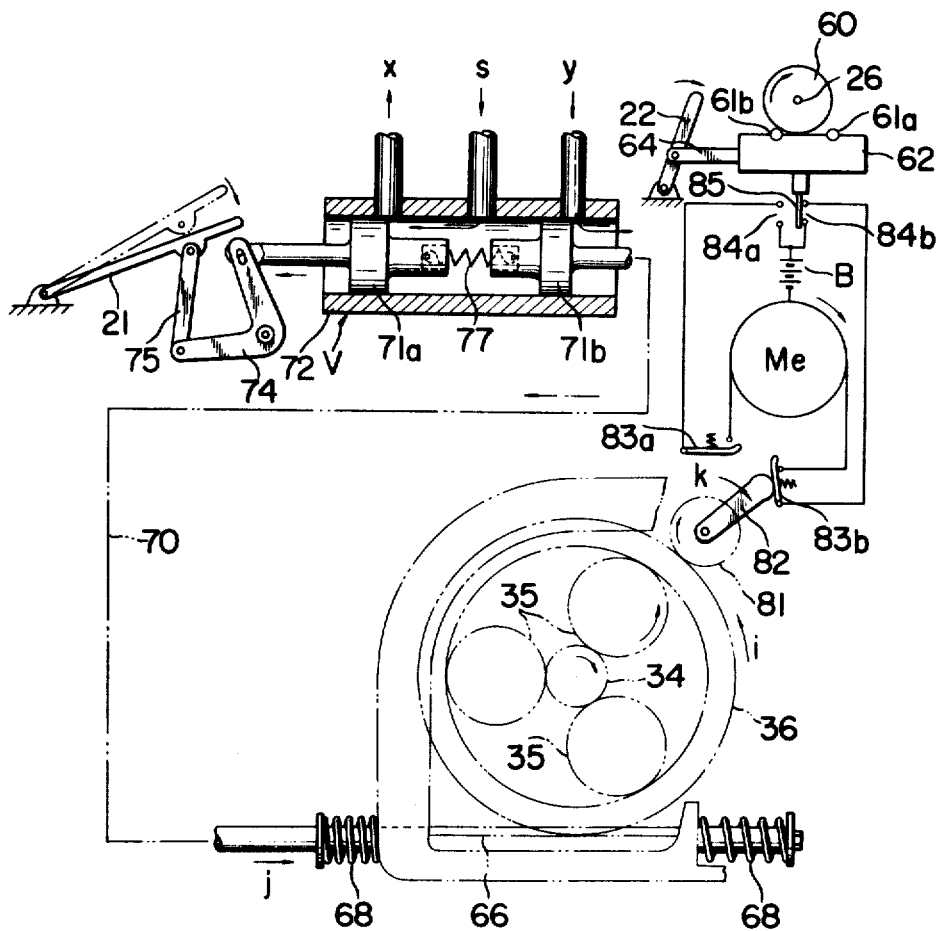
FIG. 10 is also a view similar to FIG. 5 indicating a condition when the vehicle is running in reverse.

A condition showing the reverse movement of the vehicle is illustrated in FIG. 10, in which the forward reverse control lever 22 is turned rightward as viewed in the drawing thereby to cause the roller 61b upon the carriage 62 to be wedged in between the carriage and the disk 60. As a result the input shaft 26 is permitted to turn only in the reverse direction as indicated by the arrow in the drawing, while the contact pair 84b is closed by the movable contact 85.

Upon depression of the accelerator pedal 21, the portion 71a of the valve spool 71 moves leftward (as viewed in FIG. 10) off the other spool portion 71b so that the ports S and x are intercommunicated. The air is now fed under pressure into the pneumatic motor Mp from its intake port X, thereby setting the same in operation. Since the input shaft 26 is then permitted to move only in the reverse direction, the disks 52 of the pneumatic motor Mp also are turned in the corresponding direction. This rotation of the disks 52 is conveyed to the sun wheel 34 via the intermediate shaft 40 and thence to the ring gear 36 via the planet wheels 35, the ring gear 36 then being turned counterclockwise (as indicated by the arrow i in FIG. 10) virtually for the same reasons as those set forth already in connection with FIG. 6. The arm 82 of the pinion swings as indicated by the arrow k thereby closing the switch 83b and hence initiating the rotation of the electric motor Me in the reverse direction.

The rightward movement of the rack 66 (indicated by the arrow j) is conveyed through the system of linkages 70 to the valve spool portion 71b, which then is moved oppositely to the other spool portion 71a thereby expanding the spring 77. The rack 66 in this case is not displaced to such an extent as that attained in the event of the downhill drive of the vehicle explained with reference to FIG. 9, so that the spool portion 71b does not quite close the port y. Hence the air supplied to the pneumatic motor Mp is properly exhausted therefrom. With both the electric motor Me and the pneumatic motor Mp thus rotated in the reverse direction, the vehicle will be driven in reverse by the large torque delivered by the output shaft 15.

I claim:

1. An electropneumatic propelling system for a vehicle comprising a source of compressed air, a turbine driven by air supplied under pressure from said source, a generator driven by said turbine, a storage battery adapted for storing electrical energy produced by said generator, an electric motor driven by electrical energy supplied from said storage battery, a pneumatic motor driven by air supplied under pressure from said source, valve means adapted for the control of air flow from said source to said pneumatic motor, and transmission means to which are connected both said electric motor and said pneumatic motor, and which is coupled to the driving wheels of the vehicle.

2. An electropneumatic propelling system according to claim 1, wherein said transmission means comprises an input shaft coupled to said electric motor, an output shaft coupled to the driving wheels of the vehicle, an intermediate shaft between said input shaft and said output shaft, first planet differential means at one end of said input shaft associated with said valve means and with said electric motor, and second planet differential means at one end of said output shaft to which is conveyed the rotation of said pneumatic motor.

3. An electropneumatic propelling system according to claim 2, wherein said first planet differential means comprises a ring gear loosely mounted on said input shaft, a sun wheel fixedly mounted on said input shaft, and a plurality of planet wheels meshing with both said ring gear and said sun wheel and respectively mounted on shafts fixed to an integral disk of said intermediate shaft, said ring gear being also in mesh with a rack adapted for actuation of said valve means.

4. An electropneumatic propelling system according to claim 3, wherein said rack is coupled to one of two separable portions of a spool member of said valve means, the other portion thereof being linked to an accelerator pedal of the vehicle, and said two separable portions being interconnected by means of an elastic member.

5. An electropneumatic propelling system according to claim 2, including means for causing said pneumatic motor to rotate in the same direction as a preselected rotational direction of said electric motor, said means comprising a disk fixedly mounted on said input shaft of said transmission means, a displaceable carriage adjacent the rim of said disk, a pair of rollers fixedly mounted on said carriage with a spacing therebetween, a manually actuable control lever linked to said carriage thereby to cause either one of said rollers to be wedged in between said carriage and said disk and hence to permit said input shaft to rotate only in the preselected direction, a movable contact actuated in coordination with the movement of said control lever to close the corresponding one of contact pairs respectively inserted in circuits for forward and backward rotations of said electric motor, said circuits respectively having electrical switches the corresponding one of which is closed by a member associated with said first planet differential means upon rotation in the preselected direction of said input shaft by the power supplied by said pneumatic motor.

6. An electropneumatic propelling system according to claim 1, including pneumatic shock-absorbing installed between the vehicle body and wheels, and an accumulator connected between said source of compressed air and said valve means, said buffer means being communicated with said accumulator in order to supply pneumatic pressure produced therein to the latter.

* * * * *